(12) United States Patent
Liu et al.

(10) Patent No.: US 12,229,883 B2
(45) Date of Patent: Feb. 18, 2025

(54) THREE-DIMENSIONAL OBJECT PART SEGMENTATION USING A MACHINE LEARNING MODEL

(71) Applicant: QUALCOMM Incorporated, San Diego, CA (US)

(72) Inventors: Minghua Liu, La Jolla, CA (US); Yinhao Zhu, La Jolla, CA (US); Hong Cai, San Diego, CA (US); Fatih Murat Porikli, San Diego, CA (US); Hao Su, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 181 days.

(21) Appl. No.: 18/177,028

(22) Filed: Mar. 1, 2023

(65) Prior Publication Data

US 2024/0144589 A1     May 2, 2024

Related U.S. Application Data

(60) Provisional application No. 63/382,027, filed on Nov. 2, 2022.

(51) Int. Cl.
| | | |
|---|---|---|
| *G06T 17/00* | (2006.01) | |
| *G06T 7/12* | (2017.01) | |
| *G06V 10/25* | (2022.01) | |
| *G06V 20/70* | (2022.01) | |

(52) U.S. Cl.
CPC ............ *G06T 17/00* (2013.01); *G06T 7/12* (2017.01); *G06V 10/25* (2022.01); *G06V 20/70* (2022.01); *G06T 2207/10028* (2013.01); *G06V 2201/07* (2022.01)

(58) Field of Classification Search
None
See application file for complete search history.

(56) References Cited

PUBLICATIONS

International Search Report and Written Opinion—PCT/US2023/074083—ISA/EPO—Jan. 5, 2024.
Luo T., et al., "Learning to Group: A Bottom-Up Framework for 3D Part Discovery in Unseen Categories", Arxiv.Org, Cornell University Library, 201 Olin Library Cornell University Ithaca, NY 14853, Apr. 2, 2021, pp. 1-23, XP081922770, abstract.

(Continued)

*Primary Examiner* — Robert J Craddock
(74) *Attorney, Agent, or Firm* — Polsinelli/Qualcomm

(57) ABSTRACT

Systems and techniques are provided for part segmentation. For example, a process for performing part segmentation can include obtaining a three-dimensional capture of an object. The method can include generating one or more two-dimensional images of the object from the three-dimensional capture of the object. The method can further include processing the one or more two-dimensional images of the object to generate at least one two-dimensional bounding box associated with a part of the object. The method can include performing three-dimensional part segmentation of the part of the object based on a three-dimensional point cloud generated from the one or more two-dimensional images of the object and the at least one two-dimensional bounding box and based on semantically labeled super points which are merged into subgroups associated with the part of the object.

24 Claims, 12 Drawing Sheets

(56) References Cited

PUBLICATIONS

Michele B., et al., "Generative Zero-Shot Learning for Semantic Segmentation of 3D Point Clouds", 2021 International Conference on 3D Vision (3DV), IEEE, Dec. 1, 2021, pp. 992-1002, XP033999126, abstract.

Wang X., et al., "Learning Fine-Grained Segmentation of 3D Shapes without Part Labels", Arxiv.Org, Cornell University Library, 201 Olin Library Cornell University Ithaca, NY 14853, Jan. 13, 2022, 10 Pages, XP091124560, abstract.

THREE-DIMENSIONAL OBJECT PART SEGMENTATION USING A MACHINE LEARNING MODEL

CROSS-REFERENCE TO RELATED APPLICATIONS

This application claims the benefit of U.S. Provisional Application No. 63/382,027, filed Nov. 2, 2022, which is hereby incorporated by reference in its entirety and for all purposes.

FIELD

Aspects of the present disclosure generally relate to object segmentation. For example, aspects of the present disclosure are related to systems and techniques for performing three-dimensional part segmentation (e.g., zero-shot and/or few-shot three-dimensional part segmentation) by applying a three-dimensional fusion of three-dimensional data with two-dimensional data output from a machine learning model or system (e.g., a vision language pre-trained model).

INTRODUCTION

Three-dimensional object part segmentation can include using a three-dimensional representation of an object to identify and segment different parts of an object. For instance, parts of a chair can include a back of the chair, arms of the chair, a seat of the chair, legs of the chair, etc. In some cases, a system may only be interested in certain key parts (e.g., handles of a cabinet, buttons on an electrical appliance, etc.). However, the system may not be trained or designed to identify or segment such key parts.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems and techniques for enabling a zero-shot and few-shot three-dimension object part segmentation using a vision language pre-trained model or similar models. According to at least one example, an apparatus for performing part segmentation is provided. The apparatus includes at least one memory and at least one processor coupled to at least one memory and configured to: generate one or more two-dimensional images of an object from a three-dimensional capture of the object; receive data identifying a part of the object; process the one or more two-dimensional images of the object to generate at least one two-dimensional bounding box that identifies, based on a vision language pretrained model and the data, the part of the object; perform part segmentation of the three-dimensional capture of the object to generating a plurality of super points associated with the object; based on the at least one two-dimensional bounding box, semantically label each super point of the plurality of super points to generate a plurality of semantically labeled super points; based on the plurality of semantically labeled super points, merge at least one sub-group of super points from the plurality of super points that is associated with the part of the object to generate a three-dimensional point cloud; and based on the three-dimensional point cloud, perform three-dimensional part segmentation on the part of the object.

In another example, a method of performing part segmentation is provided. The method includes: generating one or more two-dimensional images of an object from a three-dimensional capture of the object; receiving data identifying a part of the object; processing the one or more two-dimensional images of the object to generate at least one two-dimensional bounding box that identifies, based on a vision language pretrained model and the data, the part of the object; performing part segmentation of the three-dimensional capture of the object to generate a plurality of super points associated with the object; based on the at least one two-dimensional bounding box, semantically labelling each super point of the plurality of super points to generate a plurality of semantically labeled super points; based on the plurality of semantically labeled super points, merging at least one sub-group of super points from the plurality of super points that is associated with the part of the object to generate a three-dimensional point cloud; and based on the three-dimensional point cloud, performing three-dimensional part segmentation on the part of the object.

In another example, a non-transitory computer-readable medium is provided that has stored thereon instructions that, when executed by one or more processors, cause the one or more processors to: generate one or more two-dimensional images of an object from a three-dimensional capture of the object; receive data identifying a part of the object; process the one or more two-dimensional images of the object to generate at least one two-dimensional bounding box that identifies, based on a vision language pretrained model and the data, the part of the object; perform part segmentation of the three-dimensional capture of the object to generating a plurality of super points associated with the object; based on the at least one two-dimensional bounding box, semantically label each super point of the plurality of super points to generate a plurality of semantically labeled super points; based on the plurality of semantically labeled super points, merge at least one sub-group of super points from the plurality of super points that is associated with the part of the object to generate a three-dimensional point cloud; and based on the three-dimensional point cloud, perform three-dimensional part segmentation on the part of the object.

In another example, an apparatus for performing part segmentation is provided. The apparatus includes: means for generating one or more two-dimensional images of an object from a three-dimensional capture of the object; means for receiving data identifying a part of the object; means for processing the one or more two-dimensional images of the object to generate at least one two-dimensional bounding box that identifies, based on a vision language pretrained model and the data, the part of the object; means for performing part segmentation of the three-dimensional capture of the object to generating a plurality of super points associated with the object; means for, based on the at least one two-dimensional bounding box, semantically labelling each super point of the plurality of super points to generate a plurality of semantically labeled super points; means for, based on the plurality of semantically labeled super points, merging at least one sub-group of super points from the plurality of super points that is associated with the part of the object to generate a three-dimensional point cloud; and means for, based on the three-dimensional point cloud, performing three-dimensional part segmentation on the part of the object.

In another example, an apparatus for performing part segmentation includes at least one memory and at least one processor coupled to at least one memory and configured to: receive a three-dimensional image of an object; receive one or more two-dimensional bounding box associated with one or more two-dimensional image of the object generated by a model from the three-dimensional image of the object, the one or more two-dimensional bounding box associated with at least one part of the object; and perform three-dimensional part segmentation of the at least one part of the object based on the three-dimensional image of the object and the one or more two-dimensional bounding box.

In another example, a method for performing part segmentation includes: receiving a three-dimensional image of an object; receiving one or more two-dimensional bounding box associated with one or more two-dimensional image of the object generated by a model from the three-dimensional image of the object, the one or more two-dimensional bounding box associated with at least one part of the object; and performing three-dimensional part segmentation of the at least one part of the object based on the three-dimensional image of the object and the one or more two-dimensional bounding box.

In another example, a non-transitory computer-readable medium is provided that has stored thereon instructions that, when executed by one or more processors, cause the one or more processors to: receive a three-dimensional image of an object; receive one or more two-dimensional bounding box associated with one or more two-dimensional image of the object generated by a model from the three-dimensional image of the object, the one or more two-dimensional bounding box associated with at least one part of the object; and perform three-dimensional part segmentation of the at least one part of the object based on the three-dimensional image of the object and the one or more two-dimensional bounding box.

In another example, an apparatus for performing part segmentation includes: means for receiving a three-dimensional image of an object; means for receiving one or more two-dimensional bounding box associated with one or more two-dimensional image of the object generated by a model from the three-dimensional image of the object, the one or more two-dimensional bounding box associated with at least one part of the object; and means for performing three-dimensional part segmentation of the at least one part of the object based on the three-dimensional image of the object and the one or more two-dimensional bounding box.

In some aspects, one or more of the apparatuses described herein is, is part of, and/or includes an extended reality (XR) device or system (e.g., a virtual reality (VR) device, an augmented reality (AR) device, or a mixed reality (MR) device), a mobile device (e.g., a mobile telephone or other mobile device), a wearable device, a wireless communication device, a camera, a personal computer, a laptop computer, a vehicle or a computing device or component of a vehicle, a server computer or server device (e.g., an edge or cloud-based server, a personal computer acting as a server device, a mobile device such as a mobile phone acting as a server device, an XR device acting as a server device, a vehicle acting as a server device, a network router, or other device acting as a server device), another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyroscopes, one or more accelerometers, any combination thereof, and/or other sensor.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
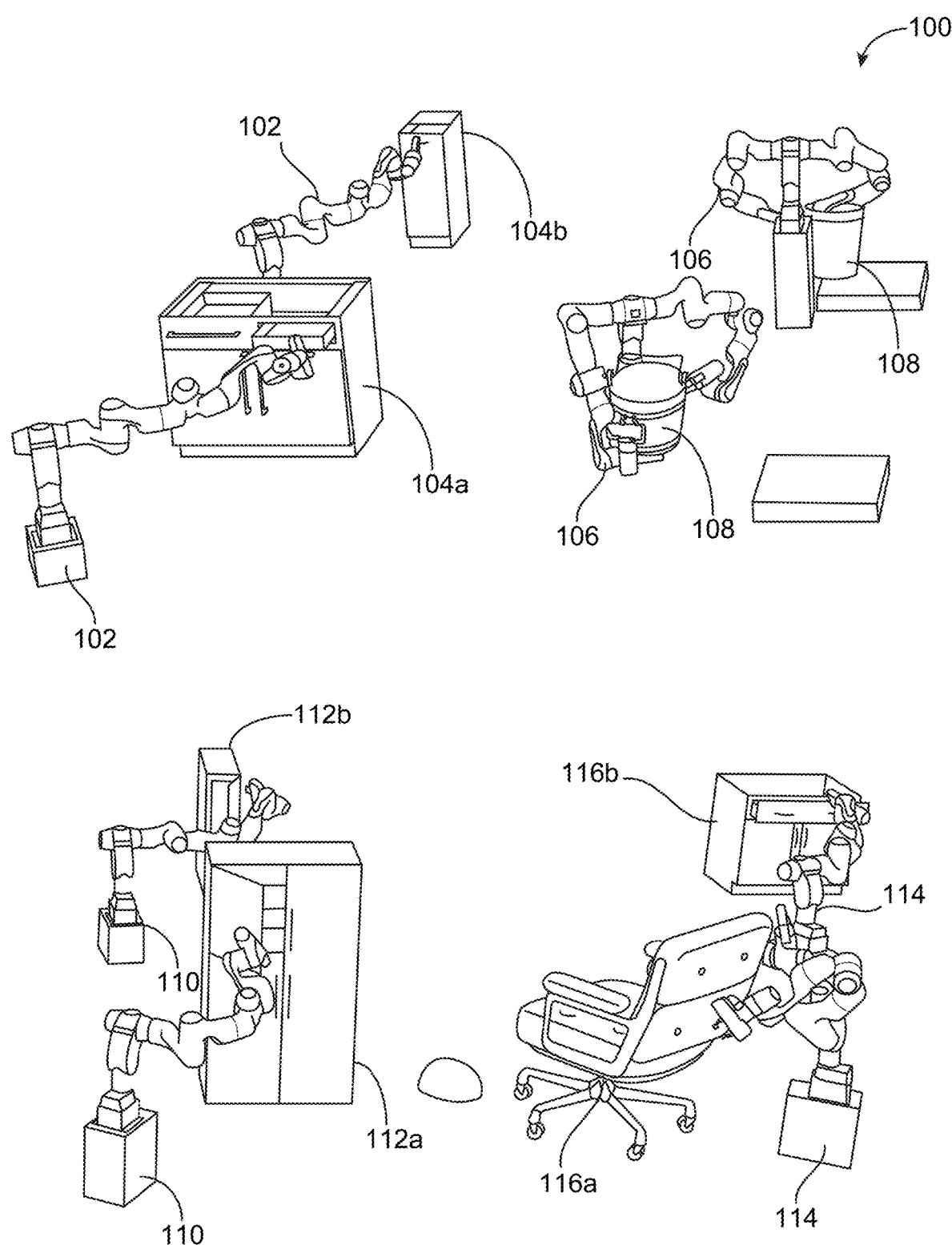
FIG. 1 illustrates a use case in which robotic manipulation of objects can be improved when different parts of the objects can be accurately identified, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Object segmentation can be difficult in some cases, such as when attempting to identify a certain part or parts of an object. For example, there may be a lack of labeled data for training a machine learning model (e.g., a neural network model) to perform three-dimensional part segmentation, such as in terms of the amount of available data and categories of parts. Such a lack of data poses a challenge to learning-based methods (e.g., supervised learning or training of a neural network model). For instance, standard supervised training only allows a machine learning model (e.g., a neural network designed to process 3D point cloud inputs) to recognize object parts observed during training (e.g., those object parts labeled in a dataset of training images). In one illustrative example, a training dataset of images may include only twenty object part categories. Models trained to perform object segmentation (e.g., conventional 3D neural networks) using such a dataset cannot identify or segment new parts that are not included in the dataset. Even for parts included in a training dataset, the recognition performance can be unsatisfactory during testing/deployment due to a vast variety of object and/or part appearances and a lack of training data.

Furthermore, there can be problems with tasks involving two-dimensional (2D) predictions, such as semantic segmentation and depth estimation. Monocular networks consume a single image and output the prediction for the single image. In some scenarios, several posed images (e.g., a measured camera position and/or orientation for each image) may be available with overlapping views, several of which can be collective processed by a machine learning model or system. However, existing monocular networks cannot take advantage of such posed images as they can only operate on single images.

Part segmentation information can greatly benefit various systems, such as robotic manipulation systems (e.g., for scene navigation, object manipulation, etc.), vehicle systems (e.g., for autonomous or semi-autonomous driving, safety warning systems, etc.), and so forth. For instance, segmentation information can allow or aid a robot in identifying where to apply force/action to move an object, such as moving a chair by pushing it in a particular direction, opening a cabinet door by grasping the handle, etc. FIG. 1 illustrates a use case in which robotic manipulation of objects can be improved when different parts of the objects can be accurately identified, in accordance with some examples. As shown, the robots 100 include a robot 102 shown with two views that manipulates an object such as a drawer in a cabinet 104a or cabinet 104b, two views of a robot 106 that manipulates an object such as a container 108 (shown with two views), two views of a robot 110 that manipulates an object such as a door in a cabinet 112a or cabinet 112b, and two views of a robot 114 that manipulates an object such as a chair 116a or a cabinet drawer 116b. Each of the objects 104, 108, 112a, 112b, and 116 is different and has different parts such as handles or lids or chair arms or legs. Depending on the task of the robot, it is important for the robot to properly identify the individual parts so that they can be manipulated by the robot.

Solutions are needed for improved part segmentation that can leverage various types of models, even models that have limitations as described above. Systems and techniques described herein can leverage pre-trained machine learning models (e.g., vision-language pre-trained (VLP) models) to perform three-dimensional (3D) part segmentation (e.g., zero-shot and/or few-shot 3D part segmentation). For instance, the machine learning model (e.g., a VLP model) can be extensively pre-trained on two-dimensional (2D) image-text data. In one example, given an image, a VLP model can recognize one or more objects and one or more parts of the one or more objects based on the provided data or text that can identify the one or more parts. In some cases, the systems and techniques can apply to any 2D visual prediction task, such as semantic segmentation and depth estimation. Visual prediction tasks can be integral parts to many applications or systems, such as extended reality (XR), vehicle systems (e.g., autonomous or semi-autonomous driving, safety systems, etc.), camera image/video processing, robotics (e.g., as shown in FIG. 1), and/or other applications or systems.

One example use case for which the systems and techniques described herein can apply is human part segmentation. The ability to recognize different parts of a human (e.g., arms, legs, head, etc.) can be useful for many applications or tasks (e.g., XR, vehicle systems, medical applications, etc.). In one illustrative example, 3D part segmentation can be used to segment different parts of a person depicted in one or more images, and virtual clothes/accessories can be placed on the parts of the person. In another illustrative example, 3D part segmentation can be performed to segment different parts of a vehicle depicted in one or more images, which can allow a robotic system to recognize different parts of the vehicle and facilitate assembly and repair tasks for the vehicle in the physical world. Other use cases can include construction, furniture manufacturing and manipulation, device manufacturing and manipulation, precision painting and coating, etc.

Figure 2:
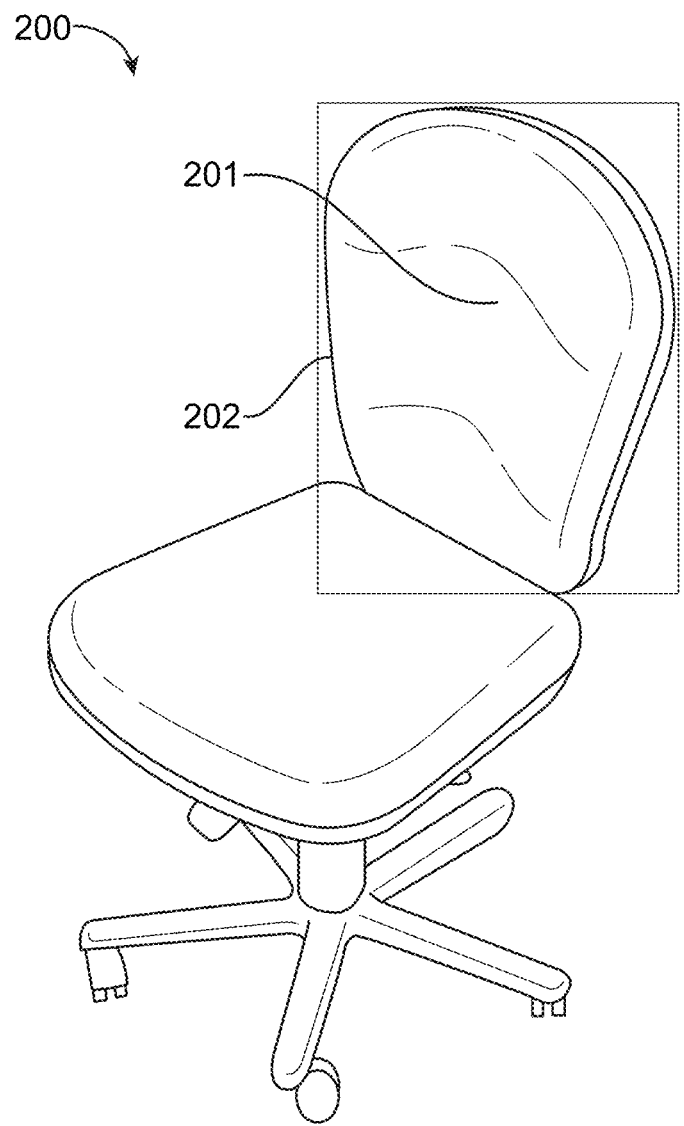
FIG. 2 illustrates a chair and a bounded area identifying a part on the chair, in accordance with some examples.

The pretrained model may include any type of machine learning model. Non-limiting illustrative examples of open-source models include CLIP (contrastive language-image pre-training), GLIP (grounded language image pre-training). The outputs of the pretrained model (e.g., the VLP model) are in two-dimensions and can include a bounding region, such as a bounding box or a bounding region or area having another shape. For instance, the output of a pretrained model is not in three dimensions. FIG. 2 illustrates a chair 200 and a bounded area 202 (shown as a bounding box) identifying a part on the chair 201 (the back of the chair). Of course, other parts of the chair can also be identified by the bounding area 202 such as the seat, chair legs, rollers, and so forth. The systems and techniques can include a 3D fusion engine that performs 3D part segmentation based on the 2D outputs from the model.

Figure 3A:
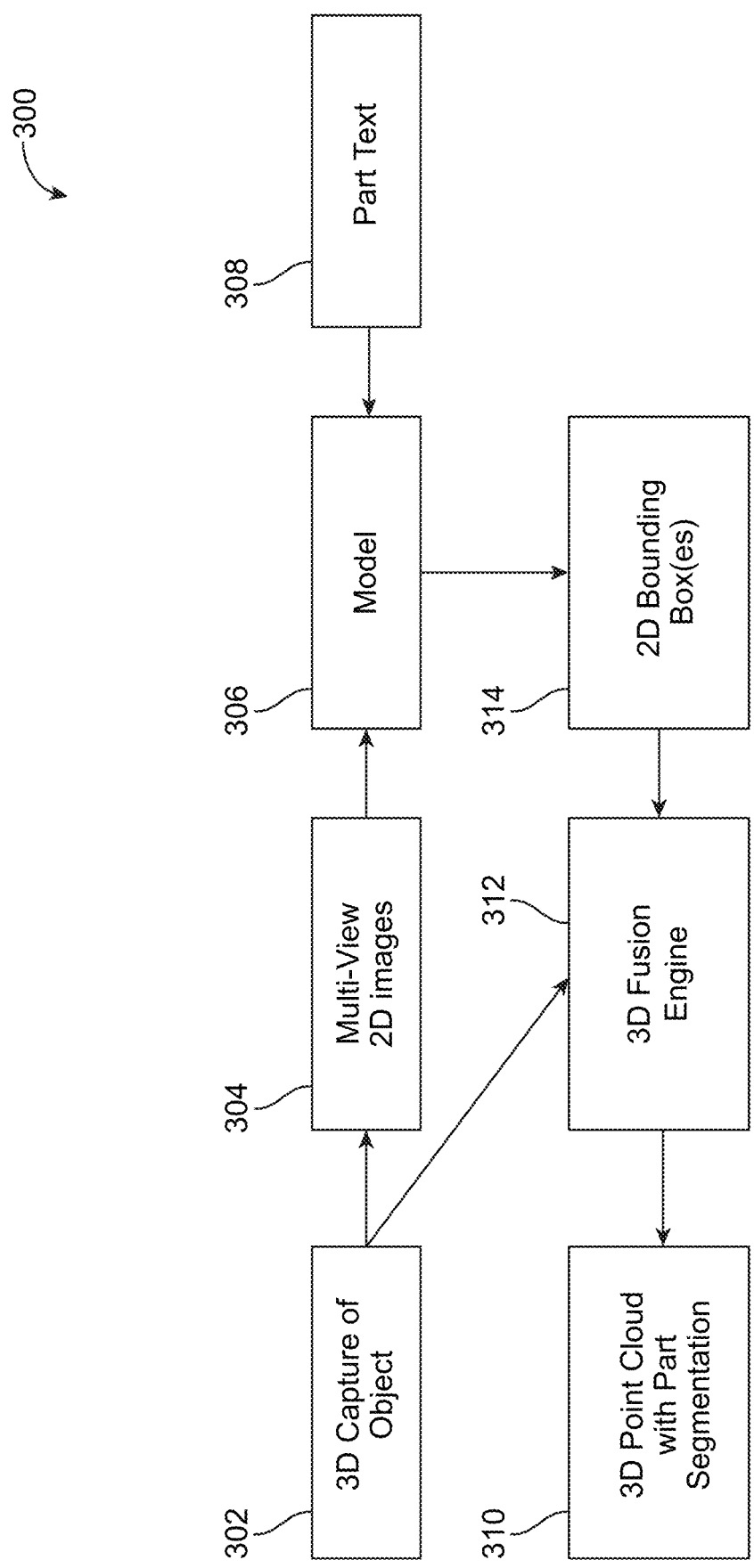
FIG. 3A is a diagram illustrating an example system for performing three-dimensional object part segmentation, in accordance with some examples.

FIG. 3A is a diagram illustrating an example of a system 300 for performing 3D object part segmentation. Given a 3D capture 302 of an object, the system 300 can segment a requested part without having to train a machine learning model. In some cases, the system 300 can use a pre-trained machine learning model 306, such as a VLP model or other type of machine learning model. In some aspects, a small amount of labeled data can be used to improve the model (e.g., fine-tuning the model by further training the pre-trained model using the small amount of labeled data, such as using supervised learning).

The system 300 can receive as input a 3D capture 302 of an object. The process can include rending multi-view 2D images 304 from the 3D capture. The system 300 can also receive part data 308 (e.g., such as text) associated with the part, such as "chair back" or "chair leg" of a chair. In some cases, the system 300 can receiver other data, such as data that identifies specific parts (e.g., images, audio data, video data, or other types of data). The segmentation can be considered "zero-shot," meaning that no labeled data of any sort is given in the target task domain. For instance, there is no labeled data of a "handle" part if the task is to identify handles. The system 300 can generate multi-view 2D images 304 from the 3D capture 302 of the object. Using the multi-view 2D images 304 and the part data 308, the machine learning model 306 (e.g., a VLP model) can determine or generate one or more 2D bounding boxes 314 that identify the parts. The one or more 2D bounding boxes 314 are provided to a 3D fusion engine 312 that also receives the 3D capture 302 of the object. The 3D fusion engine 312 can output a 3D point cloud 310 of the object with part segmentation.

Figure 4:
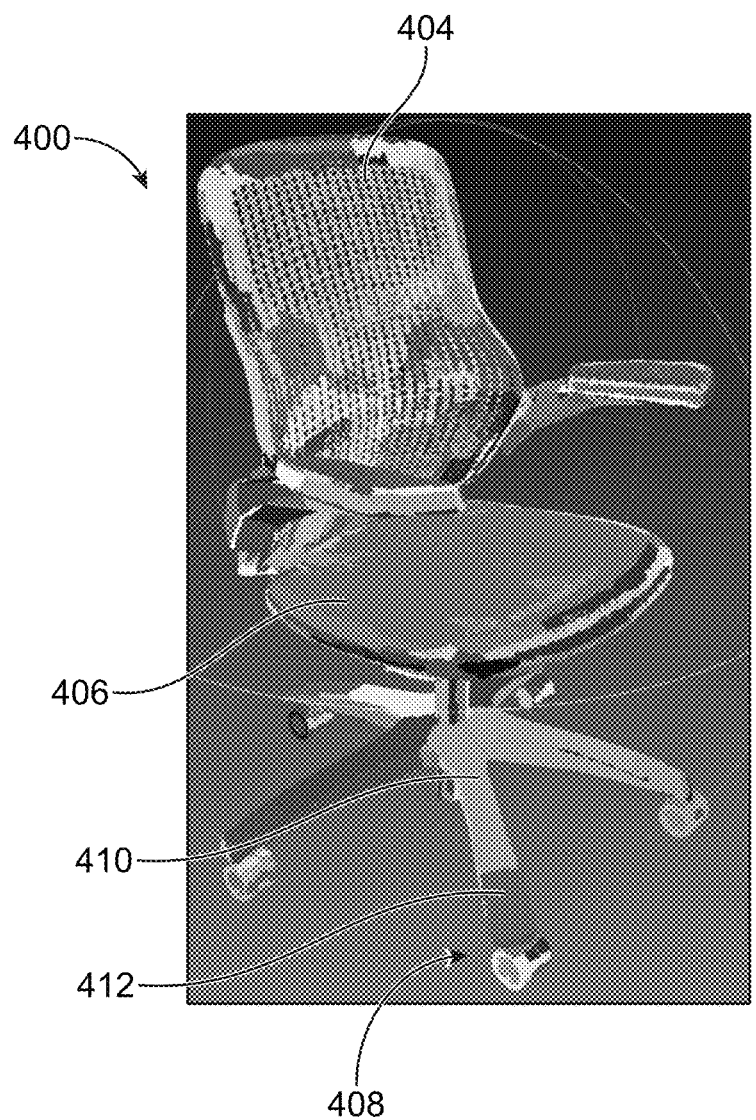
FIG. 4 illustrates a chair with different portions of specific parts highlighted, in accordance with some examples.

To generate the 3D point cloud 310 with the part segmentation, the 3D fusion engine 312 can perform one or more operations. For example, the 3D fusion engine 312 can perform over-segmentation. To perform the over-segmentation, the 3D fusion engine 312 can segment the 3D capture 302 (which can be assumed to be a point cloud) into "super points" (e.g., sub-parts) based on a respective 3D normal direction at each point in the point cloud of the 3D capture 302. FIG. 4 is a diagram illustrating a 3D capture of a chair 400. For instance, an object part (e.g., a chair back 404, a seat 406, a chair leg 408, etc.) of the chair 400 of FIG. 4 may be segmented into multiple sub-parts during the over-segmentation. In one illustrative example, a chair leg 408 can be segmented into a first sub-part 410 and a second sub-part 412. The seat 406 or any other part of the chair 400 could also be segmented into sub-parts as well.

The 3D fusion engine 312 can further perform semantically labelling of every super point (or less than all super points in other cases) based on the 2D bounding boxes 314 output from the machine learning model 306. For each part (p) category i and each super point (sp) j, a score can be calculated using images k, such as using the following equation:

$$\text{Score}[i, j] = \left( \frac{\sum_{img_k} \sum_{p \in sp[j]} [p \text{ is visible and } p \in \forall b \text{ box of category } i]}{\sum_{img_k} \sum_{p \in sp[j]} [p \text{ is visible}]} \right)$$

The equation uses "bbox" to represent the bounding box. The score indicates an amount by which a respective super point is included in one or more bounding boxes associated with the respective part category in one or more 2D images that include a part associated with the respective part category (e.g., how much the super point is covered by bounding boxes of a certain category over all the views). The 3D fusion engine 312 can normalize the score[i]. For each super point j, the 3D fusion engine 312 can label it as argmax$_i$ (score [i, j]).

The 3D fusion engine 312 can further merge super points that belong to a same part. For example, the 3D fusion engine 312 can merge two super points if the two super points have a same semantic label and if the two super points are adjacent to one another in the 3D capture 302. In another case, the 3D fusion engine 312 can merge two super points where, for views (e.g., images from different views) where both super points are visible, given each bounding box, both super points are in the bounding box or not in the bounding box.

Figure 3B:
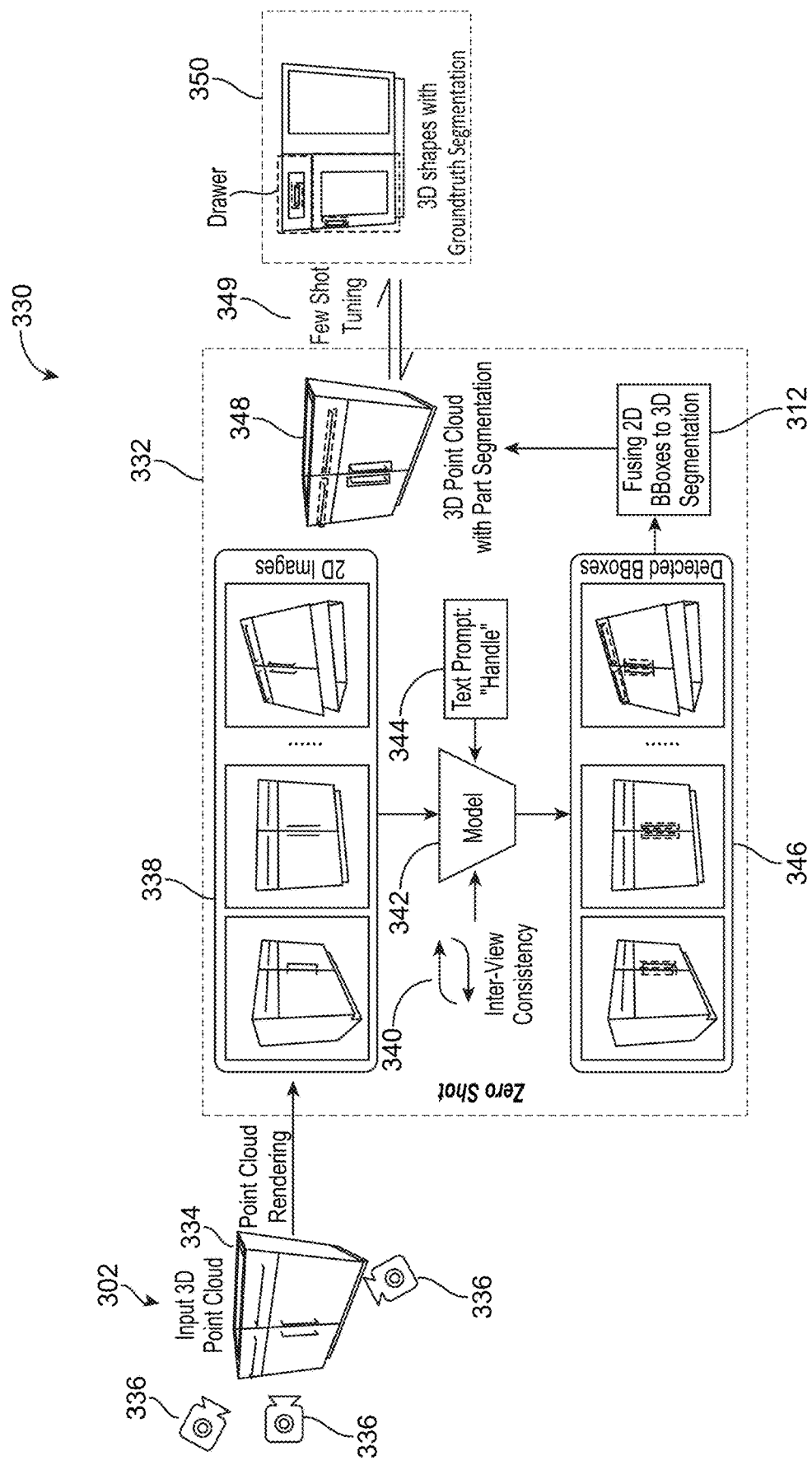
FIG. 3B is a diagram illustrating an example system for performing three-dimensional object part segmentation using a cabinet as input, in accordance with some examples.

FIG. 3B is a system 330 illustrating an example system for performing 3D object part segmentation using a 3D capture 302 (e.g., a point cloud rendering of an object generated using data from cameras 336 or other sensors) of a cabinet 334 as input. The zero-shot approach provided by the system 332 can include receiving the 3D capture 302 as input and generating 2D images 338 that are provided to the machine learning model 342 (e.g., a VLP model). The part text 344 (e.g., which can be a text prompt or other data) can also be provided as input, as described previously.

Figure 6:
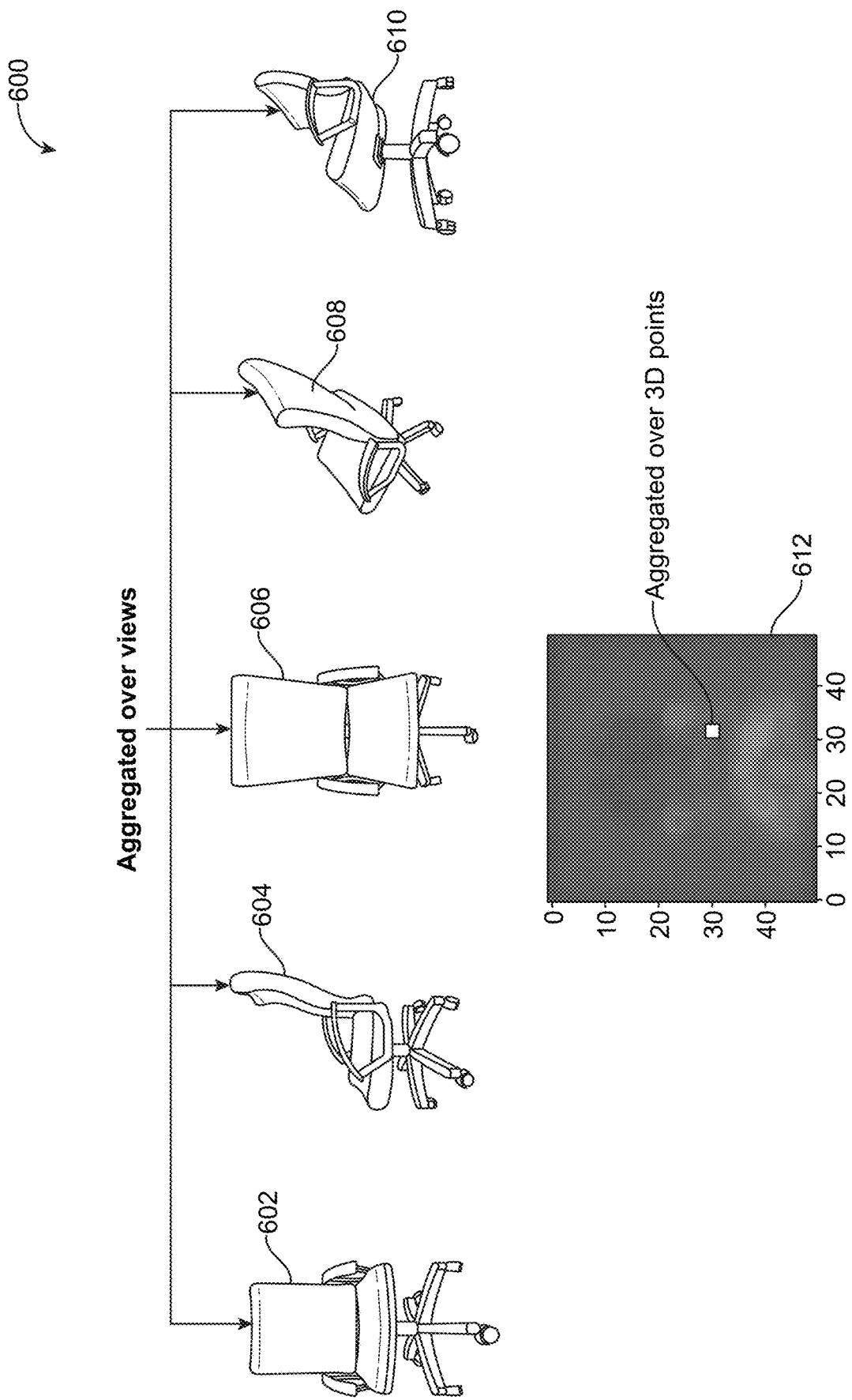
FIG. 6 is a diagram illustrating an aggregation process associated with three-dimensional object part segmentation, in accordance with some examples.

In some cases, an inter-view consistency process 340 for providing inter-view consistency (also referred to as inter-view aggregation or feature aggregation) can be performed, as further illustrated FIG. 6. For example, the inter-view consistency process 340 can provide a multi-view feature aggregation in three dimensions to enhance single-view machine learning models (e.g., neural networks) on 2D prediction tasks. The approach can use a non-learning aggregation scheme, e.g., feature averaging/pooling, which can be used at inference time directly on any existing monocular network for the 2D prediction task. The inter-view consistency process 340 can be applied to any layer of the network. The approach is a general technique to improve the performance of any 2D dense prediction network. In some cases, a short sequence of images can be used as input data (e.g., a short video, a burst of images, etc.). Camera poses can also be obtained via one or more sensors (e.g., inertial measurement units (IMU), accelerometers, gyroscopes, etc.), visual-inertial odometry (VIO) systems, and/or other device or system. The proposed solution can thus be widely applicable to different scenarios and tasks.

In some aspects, the system can utilize a learning-based aggregation scheme, e.g., a small neural network, which can be trained together with a monocular network. When testing this approach, the performance improvement has been shown. For a 2D detection task, the mAP50 improved from 0.68 to 0.74 via this method. The "mAP50" is the mean average precision with a bounding box matching threshold of mean intersection over union (mIoU)=50%.

While the numerical evaluation is done for the 2D detection task, the proposed solution can be used for any 2D dense prediction task, e.g., segmentation, depth estimation, denoising, etc.

The output 346 of the machine learning model 342 (e.g., VLP model) can include various images with detected boxes which are provided to the 3D fusion engine 312 which fuses the 2D bounding boxes to 3D segmentation. The output is a 3D point cloud 348 with part segmentation. A tuning process 349 can further be implemented to output 3D shapes with ground-truth segmentation 350. This tuning process 349 can be referred to as a "few-shot" or a "few-shot prompt tuning" approach in which input is provided for tuning.

The approach disclosed herein leverages the machine learning model 306/342 to enable zero-shot 3D part segmentation. Additional innovations include leveraging multiple views of the object of interest to improve accuracy as well as providing an efficient tuning process 349. The solution can consume a very small amount of labeled 2D data to significantly improve accuracy (e.g., using a few-shot 3D part segmentation).

The performance of the system 330 can be measured by segmentation accuracy, in term of mean Intersection over Union (mIoU). The IoU value is defined by the intersection of predicted and ground truth (GT) segmentation masks divided by the union of predicted and GT segmentation masks. In one test, semantic segmentation mIoU on 81 chair shapes, 1-shot setting was performed, and accuracies ranged for various parts from 63% to over 88%.

Figure 5:
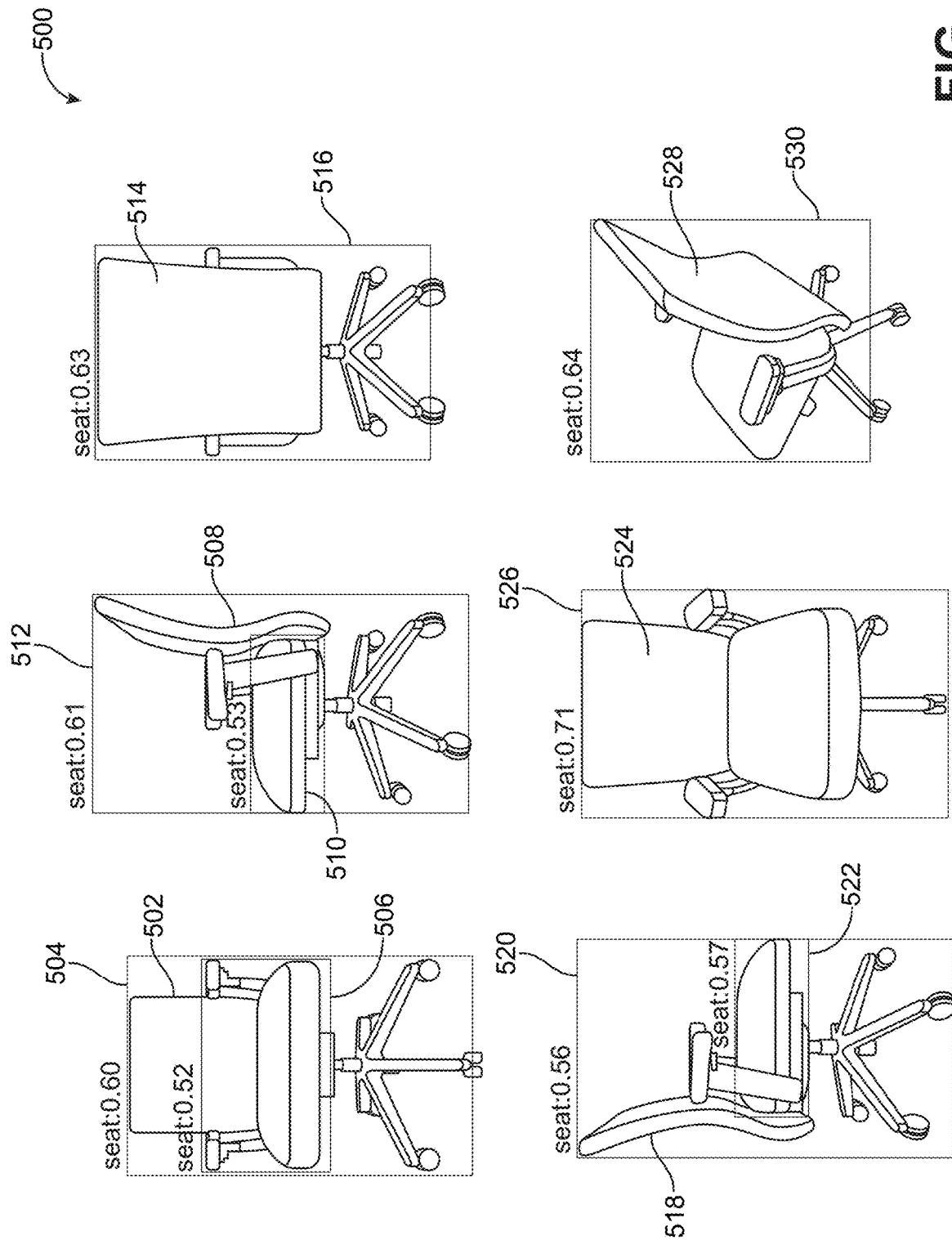
FIG. 5 illustrates various bounding boxes identifying chair parts, in accordance with some examples.

FIG. 5 illustrates various bounding boxes identifying chair parts 500 and shows how multi-view feature aggregation can occur. The chairs are shown in various views and the machine learning model 306/342 can predict good results on some views but poor results on others. Chair 502 shows one bounding box 504 for the whole chair and another bounding box 506 for the seat. A respective score or confidence of how well each respective bounding box captures the particular part are shown in each of the bounding boxes of FIG. 5. For example, bounding box 504 has a score or confidence of 0.60 related to how well it captures the seat.

The score or confidence can be a respective score/confidence for a respective part category of a plurality of part categories. The score or confidence can indicate an amount by which a respective super point is included in one or more bounding boxes associated with the respective part category in a two-dimensional image that includes a part associated with the respective part category. Bounding box 506 has a score or confidence of 0.52. Chair 508 shows one bounding box 512 for a side view of the chair and another bounding box 510 for the seat. Chair 514 shows one bounding box 516 for the chair from the rear view. Chair 518 shows one bounding box 520 for the chair with a side view and another bounding box 522 for the seat. Chair 524 has one bounding box 526 for a top view and chair 528 shows one bounding box 530 for a side view. The input 3D capture 302 to the disclosed system is a 3D shape and there is a correspondence between the multi-point cloud rending and the 2D output of the machine learning model 306/342.

FIG. 6 is a diagram 600 illustrating an aggregation process associated with 3D object part segmentation. Given n feature maps (e.g., 50×50) from n views, the process can generate n fused feature maps. For each respective 3D point (see, e.g., points identified on chair view 602, 604, 606, 608, 610), the process can average corresponding 2D pixel features over the different views. The 3D pixel features refer to the features associated with a 2D pixel location on the image. For each 2D pixel, there may be multiple 3D points, and the process can average corresponding point features. Point features refer to the features associated with a 3D point. For instance, it can be the averaged 2D features from different views for a 3D point. Since, for each 2D pixel, there may be multiple associated 3D points, the approach is to average the points features from the 3D points to obtain the features for this 2D pixel. An optional approach also includes ignoring boundary pixels. Graph 612 shows the aggregation of data over the 3D points.

Figure 7:
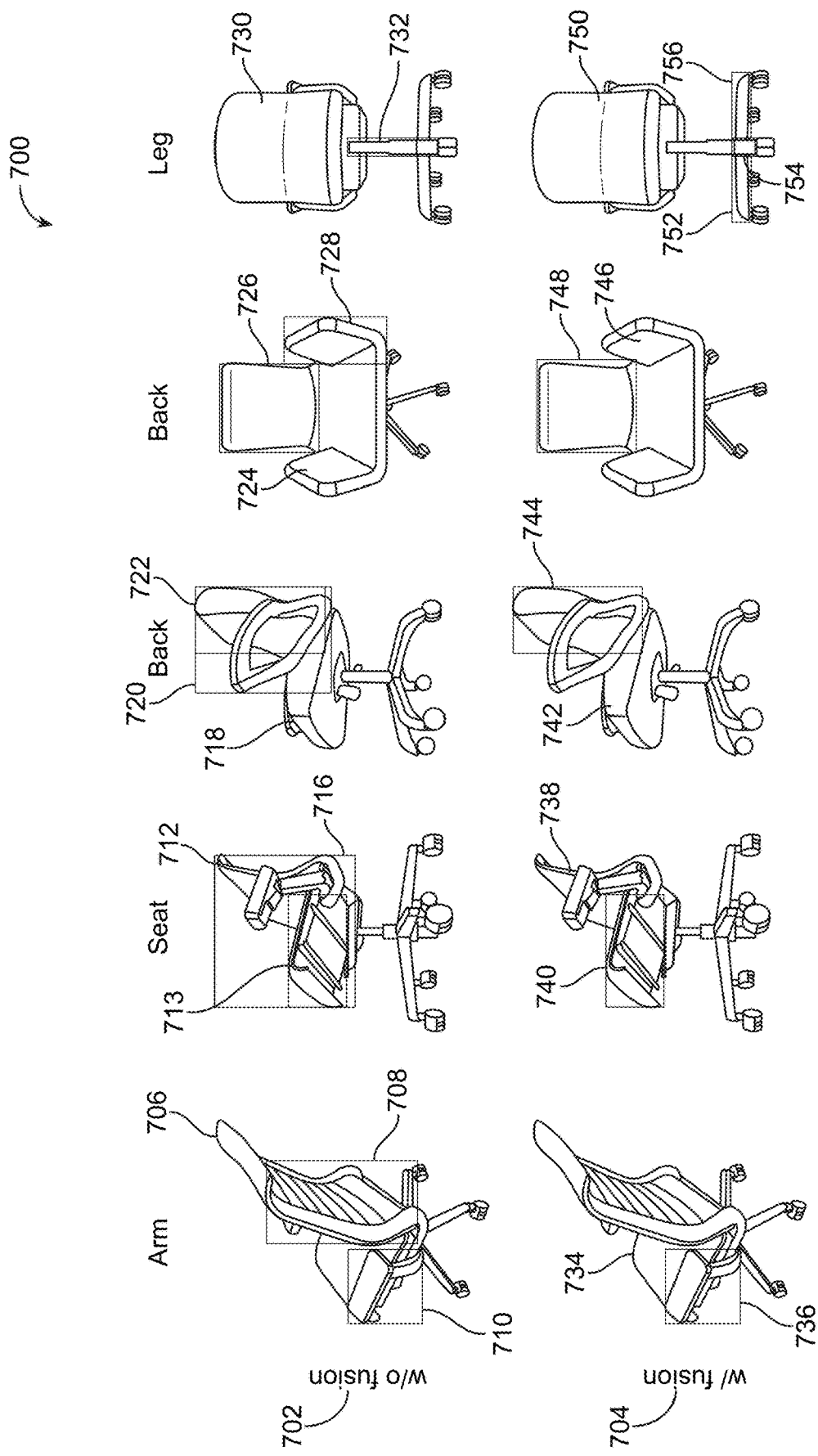
FIG. 7 is a diagram illustrating different part segmentation processes between using the disclosed principles and traditional approaches, in accordance with some examples.

FIG. 7 is a diagram 700 illustrating different part segmentation processes between using the disclosed principles and traditional approaches. The approach without fusion 702 can result in example views shown in the figure such as a chair 706 with bounding boxes 710 and 708 both being associated with the arm. Chair 712 can have a bounding box 716 and another bounding box 713 associated with the seat. Chair 718 can have a bounding box 720 and another bounding box 722 each associated with the chair back. The chair 724 can have a bounding box 726 and another bounding box 728 associated with the chair back. As shown in FIG. 7, bounding box 728 appears to be more focused on the arm of the chair rather than the back of the chair. Chair 730 can have a bounding box 732 for the leg of the chair. The various chairs and bounding boxes without fusion 702 illustrate how multiple boxes may be generated which can cause some confusion regarding what exact part the respective bounding box should be associated with.

With the fusion process 704, the results can be better. Chair 734 has a bounding box 736 for the arm. Chair 738 has a bounding box 740 for the chair seat. Chair 742 shows a bounding box 744 for the back of the chair. Chair 746 shows a bounding box 748 for the back of the chair. Chair 750 shows a bounding box 752 for one leg, another bounding box 754 for another leg and a third bounding box 756 for another leg. The improvement in the accuracy of the bounding box being associated with a particular part is apparent when using fusion.

Figure 8:
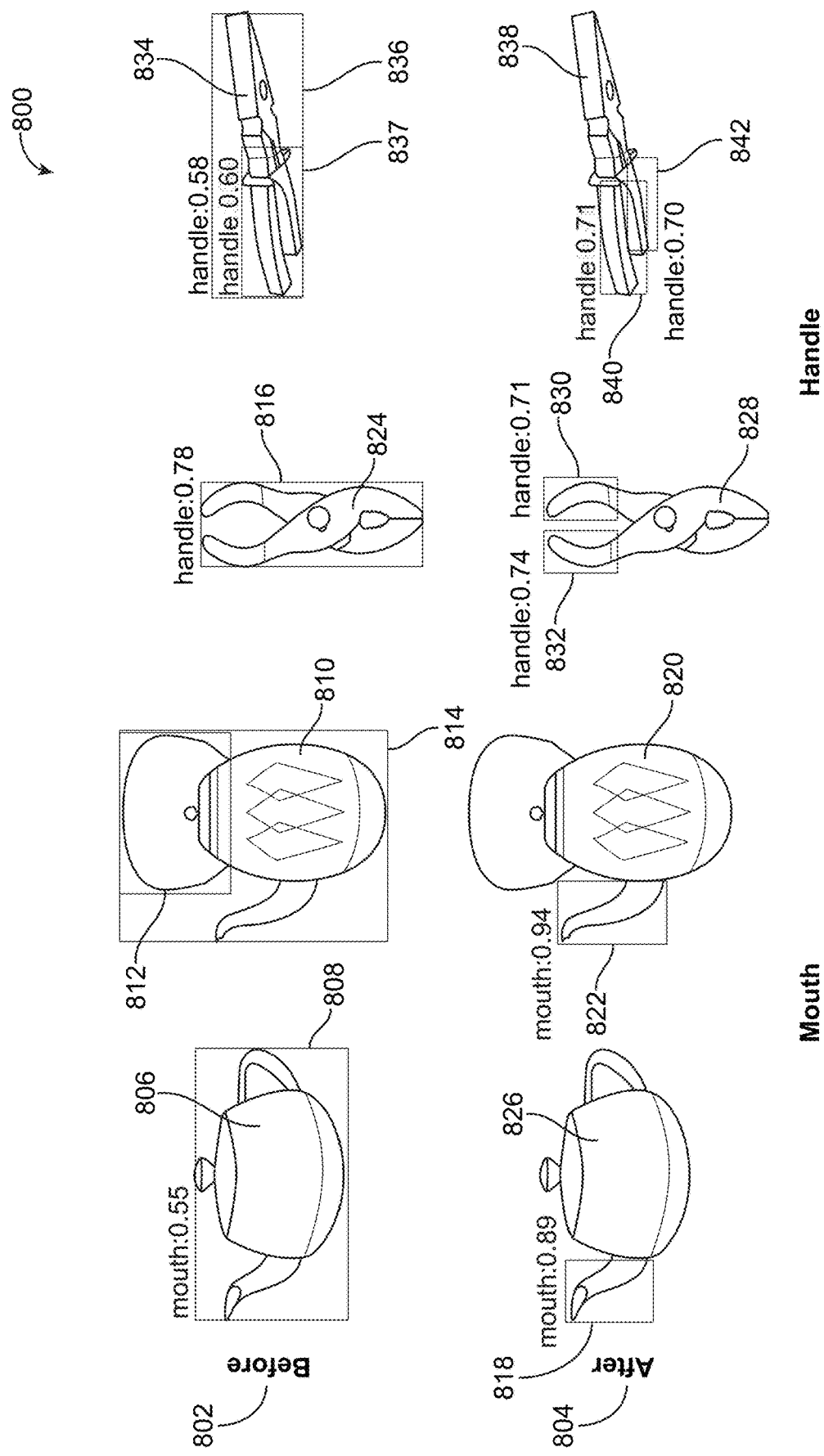
FIG. 8 is a diagram illustrating prompt tuning results associated with the object segmentation processes disclosed herein, in accordance with some examples.

FIG. 8 is a diagram 800 illustrating tuning results associated with the object segmentation processes disclosed herein. The tuning results of FIG. 8 illustrate results of a tuning process, such as the tuning process 349 described with respect to FIG. 3B. A set of images illustrate object segmentation before tuning 802. The teapot 806 includes a mouth bounding box 808 which covers the whole image. A probability or success value of 0.55 for the mouth of the teapot being appropriately covered by the bounding box 808 is shown. Teapot 810 includes a bounding box 812 for the handle and another box 814 for the whole teapot. Plyers 824 include a handle bounding box 816 for the whole set of plyers and plyers 834 also include a handle bounding box 836 for the handle as well as another handle bounding box 837 which is smaller and more focused. After tuning 804 with only one shape, the system can learn the text mapping and can generalize it to other instances. The teapot 826 is shown in a mouth bounding box 818 that is much more accurate which covers the mouth of the teapot rather than the whole teapot with a rating of 0.89. The teapot 820 has mouth bounding box 822 that is much more accurate with a rating of 0.94. The plyers 828 have a first bounding box 830 and a second bounding box 832 each around a handle with ratings of 0.74 and 0.71. The plyers 838 include a handle bounding box 840 that is more accurately around both of the handles of the plyers 838 with a rating of 0.70 and another box 842 around one handle of the plyers 838 with a rating of 0.71.

Figure 9:
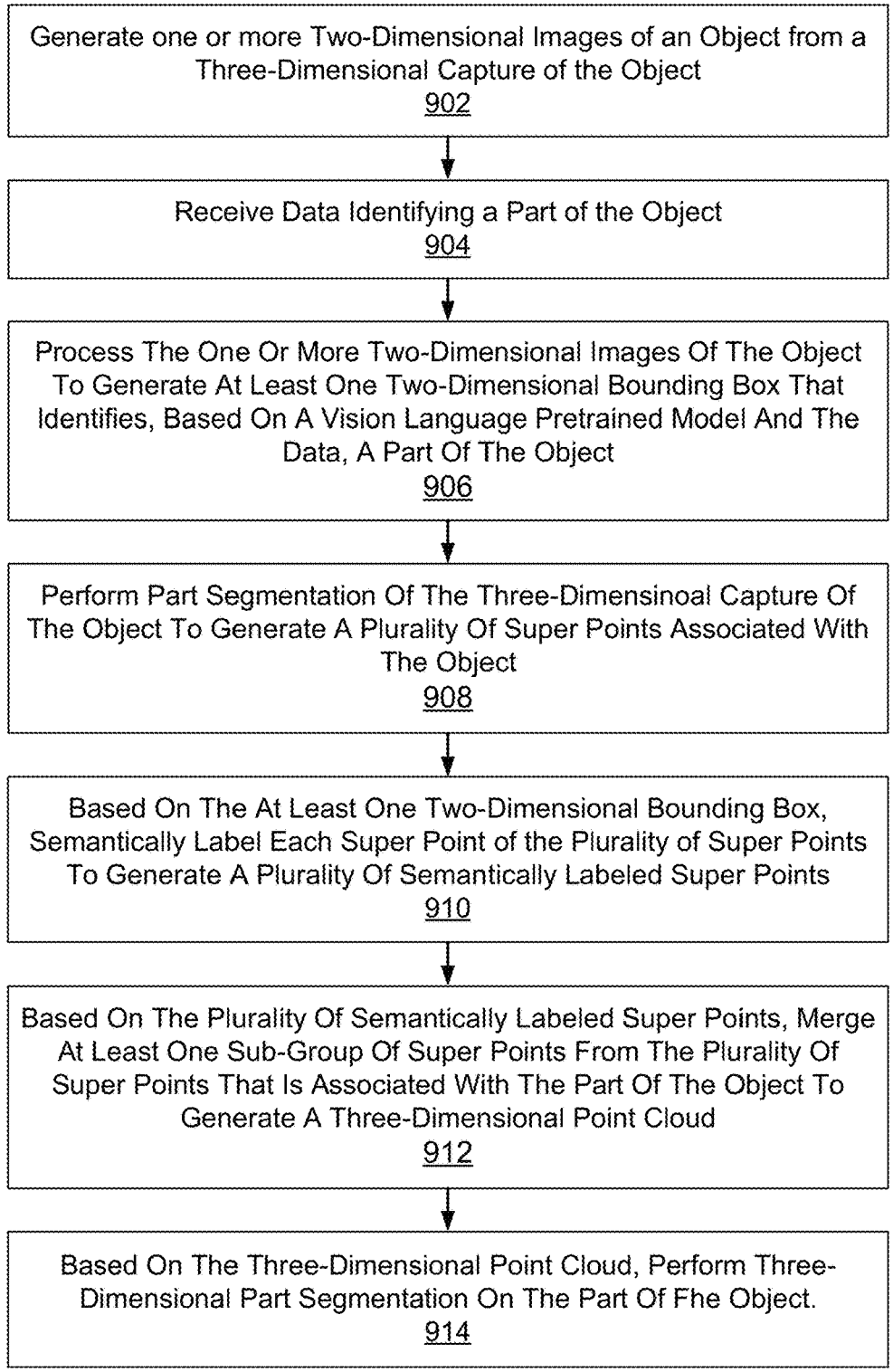
FIG. 9 is a flow diagram illustrating an example of a process for performing three-dimensional object part segmentation, in accordance with some examples.

FIG. 9 is a flow diagram illustrating an example of a process 900 for performing three-dimensional object part segmentation. The operations of the process 900 may be implemented as software components that are executed and run on one or more processors (e.g., processor 1110 of FIG. 11 and/or other processor(s)).

At block 902, the process 900 can include generating one or more two-dimensional images of an object from a three-dimensional capture of the object t (e.g., the 3D capture 302 of FIG. 3A and/or FIG. 3B). The three-dimensional capture can include an initial three-dimensional point cloud. The process 900 in one aspect can include obtaining the three-dimensional capture of the object.

At block 904, the process 900 can include receiving data identifying a part of the object (e.g., part text 308 of FIG. 3A). The data can be in any form. One example form is text that identifies the part of the object. The three-dimensional capture can be a three-dimensional point cloud, and the process 900 can include generating a modified three-dimensional point cloud (e.g., the 3D point cloud 310/334 of FIG. 3A and/or FIG. 3B) based on the three-dimensional part segmentation of the at least one part of the object.

At block 906, the process 900 can include processing the one or more two-dimensional images of the object to generate at least one two-dimensional bounding box (e.g., 2D bounding box(es) 314/346 of FIG. 3A and/or FIG. 3B) that identifies, based on a vision language pretrained model and the data, the part of the object. For instance, the at least one two-dimensional bounding box can identify the at least one part of the object based on a training of a machine learning model (e.g., the model 306/342 of FIG. 3A and/or FIG. 3B), as shown for example in FIG. 3B. In one illustrative example, the machine learning model is a vision language pretrained (VLP) model.

In some cases, the machine learning model can be pretrained on two-dimensional images and text data (e.g., the part data or text 308/344 of FIG. 3A and/or FIG. 3B), as described herein. For instance, the text/data can identify the at least one part of the object. In one illustrative example, the process 900 can include receiving data or text identifying a part of interest configured with the object. The process 900 can process the one or more two-dimensional images of the object to generate the at least one two-dimensional bounding box associated with the at least one part of the object based on the received data or text.

At block 908, the process 900 can include performing part segmentation of the three-dimensional capture of the object to generate a plurality of super points associated with the object. The plurality of super points can include sub-parts of the part of the object based on a three-dimensional normal direction at each point of the plurality of super points. In one aspect, the plurality of super points can be related to one or more sub-parts of the object based on a respective three-dimensional normal direction associated with each point of the plurality of super points. Based on performing the three-dimensional part segmentation of the at least one part of the object, the process 900 can output a three-dimensional representation (e.g., a 3D point cloud) for the object with part segmentation.

At block 910, the process 900 can include, based on the at least one two-dimensional bounding box, semantically labelling each super point of the plurality of super points to generate a plurality of semantically labeled super points. In one aspect, to semantically label each super point of the plurality of super points based on the at least one two-dimensional bounding box as part of the process 900 can include generating a respective score for a respective part category of a plurality of part categories and a respective super point associated with the respective part category. The respective score can in one example indicate an amount by which the respective super point is included in one or more bounding boxes associated with the respective part category in at least one two-dimensional image of the one or more two-dimensional images that includes a part associated with the respective part category.

At block 912, the process 900 can include based on the plurality of semantically labeled super points, merging at least one sub-group of super points from the plurality of super points that is associated with the part of the object to generate a three-dimensional point cloud. In one aspect, merging the at least one sub-group of super points that is associated with the part of the object as part of the process 900 can include merging two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

At block 914, the process 900 can include based on the three-dimensional point cloud, performing three-dimensional part segmentation on the part of the object. In one aspect, the three-dimensional point cloud can be generated based on the initial three-dimensional point cloud. In one aspect, perform the three-dimensional part segmentation of the part of the object further includes performing multi-view feature aggregation. In another aspect, performing the multi-view feature aggregation as part of the process 900 further includes, for each three-dimensional point in the three-dimensional capture of the object, averaging corresponding two-dimensional pixel features over the one or more two-dimensional images of the object.

In some aspect, the process 900 of performing the multi-view feature aggregation further includes, for each two-dimensional pixel in the one or more two-dimensional images of the object, averaging corresponding three-dimensional point features from the three-dimensional capture of the object.

In another aspect, an apparatus for performing part segmentation includes at least one memory; and at least one processor coupled to at least one memory and configured to: generate one or more two-dimensional images of an object from a three-dimensional capture of the object; receive data identifying a part of the object; process the one or more two-dimensional images of the object to generate at least one two-dimensional bounding box that identifies, based on a vision language pretrained model and the data, the part of the object; perform part segmentation of the three-dimensional capture of the object to generate a plurality of super points associated with the object; based on the at least one two-dimensional bounding box, semantically label each super point of the plurality of super points to generate a plurality of semantically labeled super points; based on the plurality of semantically labeled super points, merge at least one sub-group of super points from the plurality of super points that is associated with the part of the object to generate a three-dimensional point cloud; and based on the three-dimensional point cloud, perform three-dimensional part segmentation on the part of the object.

Figure 10:
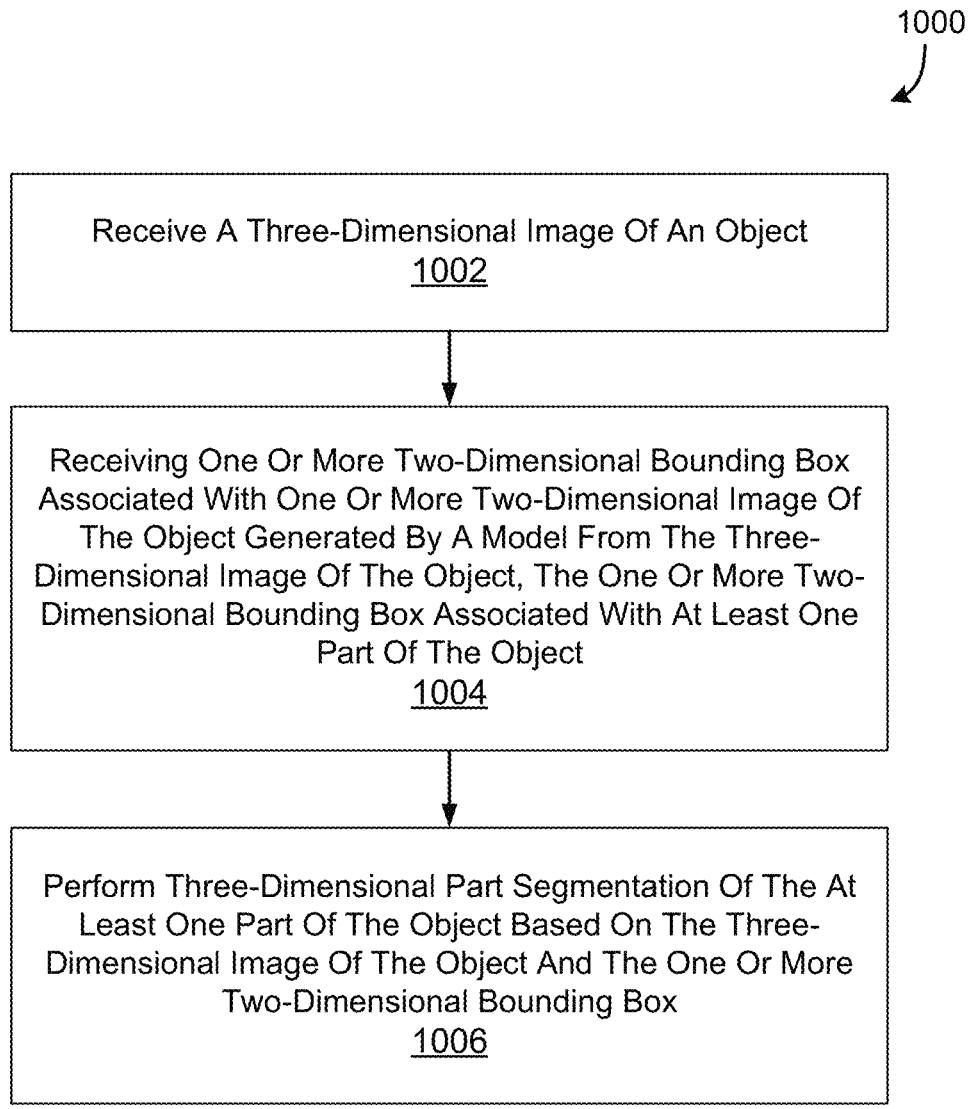
FIG. 10 is a flow diagram illustrating another example of a process for performing three-dimensional object part segmentation, in accordance with some examples.

FIG. 10 is another flow diagram illustrating an example of a process 1000 for performing three-dimensional object part segmentation. The process 1000 can be performed by any device or group of devices. The operations of the process 1000 may be implemented as software components that are executed and run on one or more processors (e.g., processor 1110 of FIG. 11 and/or other processor(s)).

At block 1002, the process 1000 can include receiving a three-dimensional image of an object. At block 1004, the process 1000 can include receiving one or more two-dimensional bounding boxes associated with one or more two-dimensional image of the object generated by a model from the three-dimensional image of the object, the one or more two-dimensional bounding boxes associated with at least one part of the object. At block 1006, the process 1000 can include performing three-dimensional part segmentation of the at least one part of the object based on the three-dimensional image of the object and the one or more two-dimensional bounding boxes.

In some examples, the processes described herein (e.g., process 900, process 1000, and/or other process described herein) may be performed by a computing device or apparatus (e.g., a network node such as a UE, base station, a portion of a base station, etc.). For instance, as noted above, the process 900 may be performed by a UE and the process 1000 may be performed by a base station or a portion of a base station. In another example, the process 900 and/or the process 1000 may be performed by a computing device with the computing system 1100 shown in FIG. 11. For instance, a wireless communication device with the computing architecture shown in FIG. 11 may include the components of the UE and may implement the operations of FIG. 9 and/or FIG. 10.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 900 and the process 1000 are illustrated as a logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 900, the process 1000, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 11:
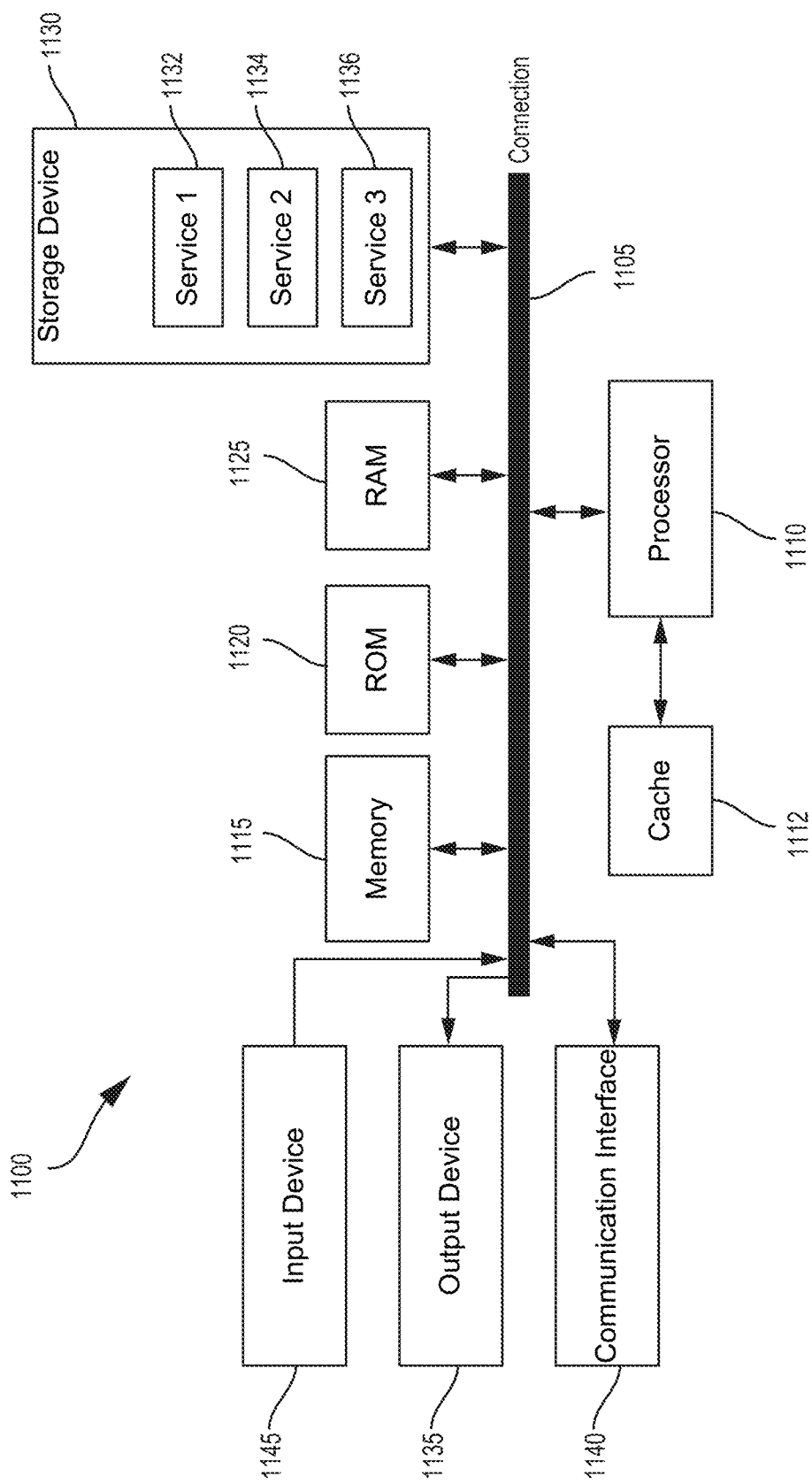
FIG. 11 is a block diagram illustrating an example of a computing system, in accordance with some examples.

FIG. 11 is a diagram illustrating an example of a system for implementing certain aspects of the present technology. In particular, FIG. 11 illustrates an example of computing system 1100, which may be for example any computing device making up internal computing system, a remote computing system, a camera, or any component thereof in which the components of the system are in communication with each other using connection 1105. Connection 1105 may be a physical connection using a bus, or a direct connection into processor 1110, such as in a chipset architecture. Connection 1105 may also be a virtual connection, networked connection, or logical connection.

In some aspects, computing system 1100 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1100 includes at least one processing unit (CPU or processor) 1110 and connection 1105 that communicatively couples various system components including system memory 1115, such as read-only memory (ROM) 1120 and random access memory (RAM) 1125 to processor 1110. Computing system 1100 may include a cache 1115 of high-speed memory connected directly with, in close proximity to, or integrated as part of processor 1110.

Processor 1110 may include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which may represent any number of input mechanisms, such as a microphone for speech, a touch-sensitive screen for gesture or graphical input, keyboard, mouse, motion input, speech, etc. Computing system 1100 may also include output device 1135, which may be one or more of a number of output mechanisms. In some instances, multimodal systems may enable a user to provide multiple types of input/output to communicate with computing system 1100.

Computing system 1100 may include communications interface 1140, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/Re-RAM), phase change memory (PCM), spin transfer torque RAM (STT-RAM), another memory chip or cartridge, and/or a combination thereof.

The storage device 1130 may include software services, servers, services, etc., that when the code that defines such software is executed by the processor 1110, it causes the system to perform a function. In some aspects, a hardware service that performs a particular function may include the software component stored in a computer-readable medium in connection with the necessary hardware components, such as processor 1110, connection 1105, output device 1135, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B.

Illustrative aspects of the disclosure include:

Aspect 1. An apparatus for performing part segmentation, comprising: at least one memory; and at least one processor coupled to at least one memory and configured to: obtain a three-dimensional capture of an object; generate one or more two-dimensional images of the object from the three-dimensional capture of the object; process the one or more two-dimensional images of the object to generate at least one two-dimensional bounding box associated with at least one part of the object; and perform three-dimensional part segmentation of the at least one part of the object based on the one or more two-dimensional images of the object and the at least one two-dimensional bounding box.

Aspect 2. The apparatus of Aspect 1, wherein the at least one two-dimensional bounding box identifies the at least one part of the object based on a training of a machine learning model.

Aspect 3. The apparatus of Aspect 2, wherein the machine learning model is a vision language pretrained (VLP) model.

Aspect 4. The apparatus of any one of Aspects 2 or 3, wherein the machine learning model is pretrained on two-dimensional images and text data.

Aspect 5. The apparatus of Aspect 4, wherein the text data identifies the at least one part of the object.

Aspect 6. The apparatus of any one of Aspects 1 to 5, wherein at least one processor is further configured to: receive text identifying a part of interest configured with the object; and process the one or more two-dimensional images of the object to generate the at least one two-dimensional bounding box associated with the at least one part of the object based on the received text.

Aspect 7. The apparatus of any one of Aspects 1 to 6, wherein the three-dimensional capture is a three-dimensional point cloud, and wherein at least one processor is further configured to: generate a modified three-dimensional point cloud based on the three-dimensional part segmentation of the at least one part of the object.

Aspect 8. The apparatus of any one of Aspects 1 to 7, wherein, to perform the three-dimensional part segmentation of the object, the at least one processor is configured to: segment of the three-dimensional capture of the object to generate a plurality of super points associated with the object; semantically label each super point of the plurality of super points based on the at least one two-dimensional bounding box; and merge at least one sub-group of super points from the plurality of super points that is associated with a same part.

Aspect 9. The apparatus of Aspect 8, wherein the plurality of super points is related to one or more sub-parts of the object based on a respective three-dimensional normal direction associated with each point of the plurality of super points.

Aspect 10. The apparatus of any one of Aspects 8 or 9, wherein, to semantically label each super point of the plurality of super points based on the at least one two-dimensional bounding box, the at least one processor is configured to generate a respective score for a respective part category of a plurality of part categories and a respective super point associated with the respective part category.

Aspect 11. The apparatus of Aspect 10, wherein the respective score indicates an amount by which the respective super point is included in one or more bounding boxes associated with the respective part category in at least one two-dimensional image of the one or more two-dimensional images that includes a part associated with the respective part category.

Aspect 12. The apparatus of any one of Aspects 8 to 11, wherein, to merge the at least one sub-group of super points that is associated with the same part, the at least one processor is configured to merge two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

Aspect 13. The apparatus of any one of Aspects 1 to 12, wherein, to perform the three-dimensional part segmentation of the at least one part of the object, the at least one processor is configured to perform multi-view feature aggregation.

Aspect 14. The apparatus of Aspect 13, wherein, to perform the multi-view feature aggregation, the at least one processor is configured to, for each three-dimensional point in the three-dimensional capture of the object, average corresponding two-dimensional pixel features over the one or more two-dimensional images of the object.

Aspect 15. The apparatus of Aspect 14, wherein, to perform the multi-view feature aggregation, the at least one processor is further configured to, for each two-dimensional pixel in the one or more two-dimensional images of the object, average corresponding three-dimensional point features from the three-dimensional capture of the object.

Aspect 16. An apparatus for performing part segmentation, comprising: at least one memory; and at least one processor coupled to at least one memory and configured to: receive a three-dimensional image of an object; receive one or more two-dimensional bounding boxes associated with one or more two-dimensional image of the object generated by a model from the three-dimensional image of the object, the one or more two-dimensional bounding boxes associated with at least one part of the object; and perform three-dimensional part segmentation of the at least one part of the object based on the three-dimensional image of the object and the one or more two-dimensional bounding boxes.

Aspect 17. A method for performing part segmentation, the method comprising: obtaining a three-dimensional capture of an object; generating one or more two-dimensional images of the object from the three-dimensional capture of the object; processing the one or more two-dimensional images of the object to generate at least one two-dimensional bounding box associated with at least one part of the object; and performing three-dimensional part segmentation of the at least one part of the object based on the one or more two-dimensional images of the object and the at least one two-dimensional bounding box.

Aspect 18. The method of Aspect 17, wherein the at least one two-dimensional bounding box identifies the at least one part of the object based on a training of a machine learning model.

Aspect 19. The method of Aspect 18, wherein the machine learning model is a vision language pretrained (VLP) model.

Aspect 20. The method of any one of Aspects 18 or 19, wherein the machine learning model is pretrained on two-dimensional images and text data.

Aspect 21. The method of Aspect 20, wherein the text data identifies the at least one part of the object.

Aspect 22. The method of any one of Aspects 17 to 21, further comprising: receiving text identifying a part of interest configured with the object; and processing the one or more two-dimensional images of the object to generate the at least one two-dimensional bounding box associated with the at least one part of the object based on the received text.

Aspect 23. The method of any one of Aspects 17 to 22, wherein the three-dimensional capture is a three-dimensional point cloud, and further comprising: generating a modified three-dimensional point cloud based on the three-dimensional part segmentation of the at least one part of the object.

Aspect 24. The method of any one of Aspects 17 to 23, wherein performing the three-dimensional part segmentation of the object comprises: segmenting of the three-dimensional capture of the object to generate a plurality of super points associated with the object; semantically labeling each super point of the plurality of super points based on the at least one two-dimensional bounding box; and merging at least one sub-group of super points from the plurality of super points that is associated with a same part.

Aspect 25. The method of Aspect 24, wherein the plurality of super points is related to one or more sub-parts of the object based on a respective three-dimensional normal direction associated with each point of the plurality of super points.

Aspect 26. The method of any one of Aspects 24 or 25, wherein semantically labeling each super point of the plurality of super points based on the at least one two-dimensional bounding box comprises generating a respective score for a respective part category of a plurality of part categories and a respective super point associated with the respective part category.

Aspect 27. The method of Aspect 26, wherein the respective score indicates an amount by which the respective super point is included in one or more bounding boxes associated with the respective part category in at least one two-dimensional image of the one or more two-dimensional images that includes a part associated with the respective part category.

Aspect 28. The method of any one of Aspects 24 to 26, wherein merging the at least one sub-group of super points that is associated with the same part comprises merging two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

Aspect 29. The method of any one of Aspects 17 to 28, wherein performing the three-dimensional part segmentation of the at least one part of the object comprises performing multi-view feature aggregation.

Aspect 30. The method of Aspect 29, wherein performing the multi-view feature aggregation, comprises, for each three-dimensional point in the three-dimensional capture of the object, averaging corresponding two-dimensional pixel features over the one or more two-dimensional images of the object.

Aspect 31. The method of Aspect 30, wherein performing the multi-view feature aggregation comprises, for each two-dimensional pixel in the one or more two-dimensional images of the object, averaging corresponding three-dimensional point features from the three-dimensional capture of the object.

Aspect 32. A method for performing part segmentation, the method comprising: receiving a three-dimensional image of an object; receiving one or more two-dimensional bounding boxes associated with one or more two-dimensional image of the object generated by a model from the three-dimensional image of the object, the one or more two-dimensional bounding boxes associated with at least one part of the object; and performing three-dimensional part segmentation of the at least one part of the object based on the three-dimensional image of the object and the one or more two-dimensional bounding boxes.

Aspect 33. The method of Aspect 32, further comprising performing operations according to any of Aspects 17 to 31.

Aspect 34. An apparatus for performing part segmentation, comprising: at least one memory; and at least one processor coupled to at least one memory and configured to: receive a three-dimensional image of an object; receive one or more two-dimensional bounding box associated with one or more two-dimensional image of the object generated by a model from the three-dimensional image of the object, the one or more two-dimensional bounding box associated with at least one part of the object; and perform three-dimensional part segmentation of the at least one part of the object based on the three-dimensional image of the object and the one or more two-dimensional bounding box.

Aspect 35. A method for performing part segmentation, the method comprising: receiving a three-dimensional image of an object; receiving one or more two-dimensional bounding box associated with one or more two-dimensional image of the object generated by a model from the three-dimensional image of the object, the one or more two-dimensional bounding box associated with at least one part of the object; and performing three-dimensional part segmentation of the at least one part of the object based on the three-dimensional image of the object and the one or more two-dimensional bounding box.

Aspect 36. A non-transitory computer-readable medium having stored thereon instructions that, when executed by one or more processors, cause the one or more processors to perform operations according to any of Aspects 17 to 33 and/or 35.

Aspect 37. An apparatus for generating virtual content in a distributed system, the apparatus including one or more means for performing operations according to any of Aspects 17 to 33 and/or 35.

Aspect 38. An apparatus for performing part segmentation, comprising: at least one memory; and at least one processor coupled to at least one memory and configured to: generate one or more two-dimensional images of an object from a three-dimensional capture of the object; receive data identifying a part of the object; process the one or more two-dimensional images of the object to generate at least one two-dimensional bounding box that identifies, based on a vision language pretrained model and the data, the part of the object; perform part segmentation of the three-dimensional capture of the object to generate a plurality of super points associated with the object; based on the at least one two-dimensional bounding box, semantically label each super point of the plurality of super points to generate a plurality of semantically labeled super points; based on the plurality of semantically labeled super points, merge at least one sub-group of super points from the plurality of super points that is associated with the part of the object to generate a three-dimensional point cloud; and based on the three-dimensional point cloud, perform three-dimensional part segmentation on the part of the object.

Aspect 39. The apparatus of Aspect 38, wherein the data comprises text that identifies the part of the object.

Aspect 40. The apparatus of any of Aspects 38 to 39, wherein the plurality of super points comprises sub-parts of the part of the object based on a three-dimensional normal direction at each point of the plurality of super points.

Aspect 41. The apparatus of any of Aspects 38 to 40, wherein the three-dimensional capture comprises an initial three-dimensional point cloud, and wherein at least one processor is further configured to: based on the initial three-dimensional point cloud, generate the three-dimensional point cloud based on performing the part segmentation.

Aspect 42. The apparatus of any of Aspects 38 to 41, wherein the plurality of super points is related to one or more sub-parts of the object based on a respective three-dimensional normal direction associated with each point of the plurality of super points.

Aspect 43. The apparatus of any of Aspects 38 to 42, wherein, to semantically label each super point of the plurality of super points based on the at least one two-dimensional bounding box, the at least one processor is configured to generate a respective score for a respective part category of a plurality of part categories and a respective super point associated with the respective part category.

Aspect 44. The apparatus of any of Aspects 38 to 43, wherein the respective score indicates an amount by which the respective super point is included in one or more bounding boxes associated with the respective part category in at least one two-dimensional image of the one or more two-dimensional images that includes a part associated with the respective part category.

Aspect 45. The apparatus of any of Aspects 38 to 44, wherein, to merge the at least one sub-group of super points that is associated with the part of the object, the at least one processor is configured to merge two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

Aspect 46. The apparatus of any of Aspects 38 to 45, wherein the at least one processor is configured to obtain the three-dimensional capture of the object.

Aspect 47. The apparatus of any of Aspects 38 to 46, wherein, to perform the three-dimensional part segmentation of the part of the object, the at least one processor is configured to perform multi-view feature aggregation.

Aspect 48. The apparatus of any of Aspects 38 to 47, wherein, to perform the multi-view feature aggregation, the at least one processor is configured to, for each three-dimensional point in the three-dimensional capture of the object, average corresponding two-dimensional pixel features over the one or more two-dimensional images of the object.

Aspect 49. The apparatus of Aspect 48, wherein, to perform the multi-view feature aggregation, the at least one processor is further configured to, for each two-dimensional pixel in the one or more two-dimensional images of the object, average corresponding three-dimensional point features from the three-dimensional capture of the object.

Aspect 50. A method for performing part segmentation, the method comprising: generating one or more two-dimensional images of an object from a three-dimensional capture of the object; receiving data identifying a part of the object; processing the one or more two-dimensional images of the object to generate at least one two-dimensional bounding box that identifies, based on a vision language pretrained model and the data, the part of the object; performing part segmentation of the three-dimensional capture of the object to generate a plurality of super points associated with the object; based on the at least one two-dimensional bounding box, semantically labelling each super point of the plurality of super points to generate a plurality of semantically labeled super points; based on the plurality of semantically labeled super points, merging at least one sub-group of super points from the plurality of super points that is associated with the part of the object to generate a three-dimensional point cloud; and based on the three-dimensional point cloud, performing three-dimensional part segmentation on the part of the object.

Aspect 51. The method of Aspect 50, wherein the data comprises text that identifies the part of the object.

Aspect 52. The method of any of Aspects 50 to 51, wherein the plurality of super points comprises sub-parts of the part of the object based on a three-dimensional normal direction at each point of the plurality of super points.

Aspect 53. The method of any of Aspects 50 to 52, wherein the three-dimensional capture comprises an initial three-dimensional point cloud, and wherein the method further comprises: based on the initial three-dimensional point cloud, generating the three-dimensional point cloud based on performing the part segmentation.

Aspect 54. The method of any of Aspects 50 to 53, wherein the plurality of super points is related to one or more sub-parts of the object based on a respective three-dimensional normal direction associated with each point of the plurality of super points.

Aspect 55. The method of any of Aspects 50 to 54, wherein semantically labelling each super point of the plurality of super points based on the at least one two-dimensional bounding box further comprises generating a respective score for a respective part category of a plurality of part categories and a respective super point associated with the respective part category.

Aspect 56. The method of Aspect 55, wherein the respective score indicates an amount by which the respective super point is included in one or more bounding boxes associated with the respective part category in at least one two-dimensional image of the one or more two-dimensional images that includes a part associated with the respective part category.

Aspect 57. The method of any of Aspects 50 to 56, wherein merging the at least one sub-group of super points that is associated with the part of the object further comprises merging two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

Aspect 58. The method of any of Aspects 50 to 57, further comprising: obtaining the three-dimensional capture of the object.

Aspect 59. The method of Aspect 58, wherein performing the three-dimensional part segmentation of the part of the object further comprises performing multi-view feature aggregation.

Aspect 60. The method of Aspect 59, wherein performing the multi-view feature aggregation further comprises, for each three-dimensional point in the three-dimensional capture of the object, average corresponding two-dimensional pixel features over the one or more two-dimensional images of the object.

Aspect 61. The method of Aspect 60, wherein performing the multi-view feature aggregation further comprises, for each two-dimensional pixel in the one or more two-dimensional images of the object, averaging corresponding three-dimensional point features from the three-dimensional capture of the object.

Aspect 62. A non-transitory computer-readable medium having stored thereon instructions that, when executed by one or more processors, cause the one or more processors to perform operations according to any of Aspects 50 to 61.

Aspect 63. An apparatus for generating virtual content in a distributed system, the apparatus including one or more means for performing operations according to any of Aspects 50 to 61.

What is claimed is:

1. An apparatus for performing part segmentation, comprising:
   at least one memory; and
   at least one processor coupled to at least one memory and configured to:
   generate one or more two-dimensional images of an object from a three-dimensional capture of the object;
   receive data identifying a part of the object;
   process the one or more two-dimensional images of the object to generate at least one two-dimensional bounding box that identifies, based on a vision language pretrained model and the data, the part of the object;
   perform part segmentation of the three-dimensional capture of the object to generate a plurality of super points associated with the object;
   based on the at least one two-dimensional bounding box, semantically label each super point of the plurality of super points to generate a plurality of semantically labeled super points;
   based on the plurality of semantically labeled super points, merge at least one sub-group of super points from the plurality of super points that is associated with the part of the object to generate a three-dimensional point cloud; and
   based on the three-dimensional point cloud, perform three-dimensional part segmentation on the part of the object.

2. The apparatus of claim 1, wherein the data comprises text that identifies the part of the object.

3. The apparatus of claim 1, wherein the plurality of super points comprises sub-parts of the part of the object based on a three-dimensional normal direction at each point of the plurality of super points.

4. The apparatus of claim 1, wherein the three-dimensional capture comprises an initial three-dimensional point cloud, and wherein at least one processor is further configured to:
   based on the initial three-dimensional point cloud, generate the three-dimensional point cloud based on performing the part segmentation.

5. The apparatus of claim 1, wherein the plurality of super points is related to one or more sub-parts of the object based on a respective three-dimensional normal direction associated with each point of the plurality of super points.

6. The apparatus of claim 1, wherein, to semantically label each super point of the plurality of super points based on the at least one two-dimensional bounding box, the at least one processor is configured to generate a respective score for a respective part category of a plurality of part categories and a respective super point associated with the respective part category.

7. The apparatus of claim 6, wherein the respective score indicates an amount by which the respective super point is included in one or more bounding boxes associated with the respective part category in at least one two-dimensional image of the one or more two-dimensional images that includes a part associated with the respective part category.

8. The apparatus of claim 1, wherein, to merge the at least one sub-group of super points that is associated with the part of the object, the at least one processor is configured to merge two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

9. The apparatus of claim 1, wherein the at least one processor is configured to obtain the three-dimensional capture of the object.

10. The apparatus of claim 1, wherein, to perform the three-dimensional part segmentation of the part of the object, the at least one processor is configured to perform multi-view feature aggregation.

11. The apparatus of claim 10, wherein, to perform the multi-view feature aggregation, the at least one processor is configured to, for each three-dimensional point in the three-dimensional capture of the object, average corresponding two-dimensional pixel features over the one or more two-dimensional images of the object.

12. The apparatus of claim 11, wherein, to perform the multi-view feature aggregation, the at least one processor is further configured to, for each two-dimensional pixel in the one or more two-dimensional images of the object, average corresponding three-dimensional point features from the three-dimensional capture of the object.

13. A method for performing part segmentation, the method comprising:
    generating one or more two-dimensional images of an object from a three-dimensional capture of the object;
    receiving data identifying a part of the object;
    processing the one or more two-dimensional images of the object to generate at least one two-dimensional bounding box that identifies, based on a vision language pretrained model and the data, the part of the object;
    performing part segmentation of the three-dimensional capture of the object to generate a plurality of super points associated with the object;
    based on the at least one two-dimensional bounding box, semantically labelling each super point of the plurality of super points to generate a plurality of semantically labeled super points;
    based on the plurality of semantically labeled super points, merging at least one sub-group of super points from the plurality of super points that is associated with the part of the object to generate a three-dimensional point cloud; and
    based on the three-dimensional point cloud, performing three-dimensional part segmentation on the part of the object.

14. The method of claim 13, wherein the data comprises text that identifies the part of the object.

15. The method of claim 13, wherein the plurality of super points comprises sub-parts of the part of the object based on a three-dimensional normal direction at each point of the plurality of super points.

16. The method of claim 13, wherein the three-dimensional capture comprises an initial three-dimensional point cloud, and wherein the method further comprises:
    based on the initial three-dimensional point cloud, generating the three-dimensional point cloud based on performing the part segmentation.

17. The method of claim 13, wherein the plurality of super points is related to one or more sub-parts of the object based on a respective three-dimensional normal direction associated with each point of the plurality of super points.

18. The method of claim 13, wherein semantically labelling each super point of the plurality of super points based on the at least one two-dimensional bounding box further comprises generating a respective score for a respective part category of a plurality of part categories and a respective super point associated with the respective part category.

19. The method of claim 18, wherein the respective score indicates an amount by which the respective super point is included in one or more bounding boxes associated with the respective part category in at least one two-dimensional image of the one or more two-dimensional images that includes a part associated with the respective part category.

20. The method of claim 13, wherein merging the at least one sub-group of super points that is associated with the part of the object further comprises merging two super-points based on at least one of the two super-points having a same semantic label, a first super-point of the two super-points being adjacent to a second super-point of the two super-points, or whether the two super-points are included in a respective bounding box of a two-dimensional image of the one or more two-dimensional images including the two super-points.

21. The method of claim 13, further comprising:
    obtaining the three-dimensional capture of the object.

22. The method of claim 21, wherein performing the three-dimensional part segmentation of the part of the object further comprises performing multi-view feature aggregation.

23. The method of claim 22, wherein performing the multi-view feature aggregation further comprises, for each three-dimensional point in the three-dimensional capture of the object, average corresponding two-dimensional pixel features over the one or more two-dimensional images of the object.

24. The method of claim 23, wherein performing the multi-view feature aggregation further comprises, for each two-dimensional pixel in the one or more two-dimensional images of the object, averaging corresponding three-dimensional point features from the three-dimensional capture of the object.

* * * * *